United States Patent [19]

Waehner et al.

[11] 3,992,511
[45] Nov. 16, 1976

[54] RECOVERY OF SELENIUM

[75] Inventors: Kenneth A. Waehner; Anthony T. Giammarise, both of Webster, N.Y.

[73] Assignee: Xerox Corporation, Stamford, Conn.

[22] Filed: Apr. 14, 1972

[21] Appl. No.: 244,234

Related U.S. Application Data

[63] Continuation-in-part of Ser. No. 853,534, Aug. 27, 1969, abandoned.

[52] U.S. Cl. .................................. 423/510; 75/105
[51] Int. Cl.$^2$ .......................................... C01B 19/00
[58] Field of Search ............. 423/508, 509, 510, 87; 75/109, 105

[56] References Cited
UNITED STATES PATENTS

| | | | |
|---|---|---|---|
| 1,136,872 | 4/1915 | Hamilton | 75/105 |
| 3,090,671 | 5/1963 | Buchanan | 423/508 |
| 3,180,705 | 4/1965 | Freedman | 423/29 |

OTHER PUBLICATIONS

Hamada, "Rate of Solution of Selenium in Sodium Cyanide Solution" *Nippon Kagaku Zasshi,* vol. 83 (1962) pp. 667–672.

*Primary Examiner*—Oscar R. Vertiz
*Assistant Examiner*—Brian E. Hearn

[57] ABSTRACT

A process for recovering pure selenium from metal substrates having a selenium coating thereon without impairment of the substrate for reuse which comprises substantially converting the selenium in said coating to a water-soluble selenocyanate by immersing the coated substrate in an aqueous solution of an alkali metal cyanide, removing the substrate from the resultant solution, treating the resultant solution with an acid to precipitate the selenium from the remaining liquid.

10 Claims, No Drawings

RECOVERY OF SELENIUM

This application is a continuation-in-part of co-pending application Ser. No. 853,534 filed Aug. 27, 1969 now abandoned.

This present invention relates to a process for recovering pure selenium from selenium-coated metal substrates. More particularly the present invention relates to a process for recovering selenium-coated metal substrates whereby both the selenium and the metal substrate can be reused.

Most known methods for selenium recovery rely upon the well known solubility of selenium in solutions of alkali metal cyanides. The problems in selenium recovery, however, are normally attributable to the nature of the selenium-containing body or source. For example, flue dust residues from sulfuric acid manufacture have heretofore been treated with concentrated potassium cyanide solutions to form a double cyanide of potassium and selenium, and the selenium has been recovered from this solution by decomposition with hydrochloric acid. Because of the carbonaceous nature of the dust, it is relatively unaffected by the cyanide treatment. Moreover, the state of the dust after cyanide treatment is of no particular concern because of the relatively small economic interest in the residual dust. Thus, the concentration of the cyanide solution, the duration of treatment and the nature of the residue is of little concern.

In comparison, howevr, U.S. Pat. No. 3,090,671 describes a method of recovering selenium from its ores. In ores or minerals, the selenium is not present in a free or elementary state but is in combination and association with other metals, elements and minerals, the most notable of which is silver. In order to preserve the silver values of the ore and preclude the ready tendency of silver to dissolve in cyanide solution with, in this instance, the simultaneous formation of silver selenides which are extremely difficult to separate, the patent describes the use of extremely dilute cyanide solutions with concomitantly long periods of treatment. The process involves comminuting the ore body and immersing the comminuted ore into a very dilute (0.1 to 0.3%) solution of alkali metal cyanide while continuously grinding the ores to a fineness sufficient to expose enough surface area to permit recovery of at least about 90% of the selenium within a period of about 24 to 72 hours, and thereafter separating the solution from the ore residue and recovering the selenium by precipitation.

Thus, in this instance, because of the potential value of the ore residue, dilute cyanide solutions are employed over long periods of time in order to preferentially remove the selenium without effecting separation of other valuable components of the ore. The ore body, itself, however, is physically destroyed by comminuting and grinding. The nature or condition of the ore body is thus of no concern once all metal values have been extracted.

Selenium is one of the few known materials which is both photoconductive and photovoltaic. Because of these characteristics, selenium has found wide usage in the production of electronic components as well as in image copying processes. Thus, selenium is used to coat specially treated high purity silicon to form a PN junction in microelectronic circuits, and in the production of rectifiers by being coated on a conductive metallic base such as copper. When employed in rectifiers, it is common to "dope" the selenium with arsenic to form a selenium-arsenic alloy which has improved p-type or "hole-type" conducting properties. It is desired to sometimes reclaim the selenium from the electronic components after it has served its use.

Selenium, as well as arsenic-doped selenium, is used in significant amounts in image reproduction techniques such as electrostatography. The basic electrostatographic process as taught by C. F. Carlson in U.S. Pat. No. 2,297,691 involves placing a uniform electrostatic charge on a photoconductive insulating layer, exposing the layer to a light and shadow image to dissipate the charge on the areas of the layer exposed to the light, and developing the electrostatic latent image by depositing on the image a finely-divided electroscopic material referred to in the art as "toner". At the present time, the most widely used photoconductive insulating layers are selenium and selenium-arsenic alloys. The toner will normally be attracted to those areas of the photoconductive layer which retain a charge, thereby forming a toner image corresponding to the electroscopic latent image. The powder image may then be transferred to a support surface such as paper and subsequently may be permanently affixed to the support surface by heat.

The presently available electrostatographic processes and apparatus afford a relatively long life for the selenium photoconductive insulating layer employed therein. However, after very prolonged use, the selenium layer will become scratched or otherwise damaged as a result of the various conditions to which it is subjected during operation. Thus, for example, one common method for developing the electrostatic image on a selenium plate is known as the "cascade" development as disclosed by E. N. Wise in U.S. Pat. No. 2,618,552. In this method, developer material, comprising relatively large carrier particles having finely-divided toner particles electrostatically clinging to the surface thereof, is conveyed to and rolled or cascaded across the electrostatic latent image-bearing selenium surface. The continuous contact of the developer composition with the image-bearing surface eventually wears the selenium layer to cause irregular imperfections thereon. Additionally, as is conventional in automatic electrostatographic equipment, the image-bearing plate in the form of a cylindrical drum is continuously rotated through a cycle of sequential operations including charging, exposure, developing, transfer and cleaning. During these operations, and especially during the developing, transfer and cleaning operations, the drum is subjected to forces such as frictional forces which may lead to scratching, and otherwise cause imperfections, on the selenium surface. Thus, in the transfer step, the selenium surface having the powdered image thereon is rotated and transferred to a support surface such as paper which is moved through the equipment at the same rate as the periphery of the drum and contacts the drum. Slight variations in peripheral speed of the drum and rate of transfer of this support surface will result in some scratching of the drum. Further frictional forces on the drum are encountered during the cleaning operation which conventionally employs a "web"-type cleaning apparatus as disclosed, for example, in U.S. Pat. No. 3,186,838 to W. P. Graff, Jr. Removal of the residual powder and carrier particles on the plate is effected by rubbing a web of fibrous material against the image plate surface.

These webs are held under pressure in rubbing or wiping contact with the image surface and are gradually advanced to present a clean surface to the plate whereby substantially complete removal of the residual powder and carrier particles from the plate is effected. Eventually the surface is not uniformly photoconductive for the production of good quality copies and the drum is taken out of service. It is quite important to recover the selenium from the drum without damage to the drum so that both the selenium and the drum can be reused. It would be highly desirable to have an economic process for recovering selenium from these substrates in a manner which does not damage the substrate to thereby permit the substrate to be recoated with selenium.

Both selenium and arsenic are very expensive materials and thus there is a strong economic incentive to recover them in their pure form. The most commonly employed process for removing selenium from a metal substrate for subsequent recovery of selenium in its pure form is by contacting the selenium coated substrate with a hot alkali metal sulfite solution. The selenium is dissolved in the solution and subsequently recovered therefrom in its pure form by precipitation with sulfuric acid. While the selenium is recovered in its pure form by this process, several disadvantages in the process restrict its use. Thus, hot alkali metal sulfite solution will attack many metal substrates such as brass, nickel and aluminum or the like so that they may become pitted and cannot be recovered for subsequent coating with selenium or selenium-arsenic alloy. Furthermore, the treatment with alkali metal sulfite solution is carried out at elevated temperatures at which the solution is corrosive so that expensive controls and involved processes are required to overcome the problems inherent in corrosive materials. In addition, treatment with hot alkali metal sulfite solution is not effective when it is desired to strip selenium-arsenic alloys; the binary alloy in all possible proportions is completely inert to this sulfite solvent. Accordingly, there is a present need for a process for recovering pure selenium from selenium-coated metal substrates which will not adversely affect the substrate, which does not require expensive apparatus and procedures, and is easily adaptable to the recovery of selenium from coatings of pure selenium as well as arsenic-selenium, each on any one of a variety of substrates.

Although selenium is known to be soluble in alkali metal cyanide solutions, the known techniques for recovery of selenium from flue dust or ores have been found to be ineffectual in providing a means for recovery of both the selenium and the metal substrate in a reusable condition. For example, it has been found that under ambient conditions and using dilute cyanide solutions such as employed in U.S. Pat. No. 3,090,671, very little selenium is recovered in a practical and economically attractive time period of up to about one hour. At higher temperatures, e. g. 75° C, the selenium film is separated intact from the metal substrate. Upon separation, the film does not dissolve but instead, curls into a hardened mass which entraps portions of the cyanide solution and substantially interferes with useful recovery of the selenium or convenient separation of the selenium and arsenic.

It has also been found that alkali metal cyanide solutions undergo hydrolysis with the extent of hydrolysis increasing with concentration, time and temperature. The hydrolyzed product is an alkali metal hydroxide. While cyanide solutions, per se, will not attack the metal substrates used in preparing electrostatographic surfaces, the hydroxide by-product has been found to attack the metal substrates and thereby impair their ability to be reused. Thus, if dilute solutions of cyanides are used for long periods of time as in ore treatment, sufficient hydrolysis can occur to give rise to hydroxide attack on the metal substrate thereby separating, rather than dissolving the selenium film and hampering its recovery as well as impairing reuse of the metal substrate. As the temperature is raised, or as the cyanide concentration is increased, the rate of hydrolysis also increases to a point where even relatively short exposure of the selenium coated metal substrate will result in sufficient etching of the metal substrate to substantially impair its reuse.

Accordingly, it is an object of the present invention to provide an improved process for recovering pure selenium from a metal substrate. It is a further object of the present invention to provide a process for separating and recovering pure selenium and pure arsenic from arsenic-selenium alloys on metal substrates. It is a still further object of the present invention to provide a process for recovering pure selenium or pure selenium and arsenic from selenium or arsenic-selenium alloy-coated substrates without damaging the substrate. Further objects of the present invention will become evident in view of the following detailed disclosure.

In accordance with the present invention, these objects are accomplished by a process for recovering pure selenium from a selenium-containing coating on a metal substrate without impairment of the substrate for reuse which comprises immersing the coated substrate in an aqueous solution of an alkali metal cyanide containing from 1 to about 20% by weight of an alkali metal cyanide maintained at a temperature varying from about 25° to about 75° C. for a finite period of about one hour or less, the temperature and time period employed being commensurate with the alkali metal cyanide concentration such that the selenium in said coating is substantially converted to a water-soluble selenocyanate without impairing the substrate for reuse, removing the substrate from the resultant solution, and treating the resultant solution with an acid to precipitate the selenium from said solution. When a selenium-arsenic alloy is contacted with an alkali metal cyanide, in aqueous solution, a water-soluble selenium compound is formed, while the arsenic advantageously separates from solution as a finely-divided elemental precipitate. The arsenic is recovered by any convenient means such as by centrifugation or filtration. The aqueous selenocyanate solution is then treated with an acid to convert the selenocyanate to a selenium metal while forming hydrogen cyanide and a water-soluble alkali metal salt as by-products. The selenium is then recovered by any convenient means such as by filtration. The process of this invention is especially advantageous for use in recovering selenium from selenium or selenium-arsenic alloy coated substrates since by operating within the parameters of the present invention the selenium or selenium-arsenic alloy is effectively removed from the substrate in a manner which enables the substrate to be readily reused.

The process of this invention has distinct advantages over the presently employed procedures for reclaiming selenium from selenium coated metal substrates. The alkali metal cyanide reagents employed will not corrode commonly employed metal substrates such as aluminum, copper, brass or nickel, used in rectifiers, electrostatic image plates and the like. The stripped metal substrates then can be recoated with selenium or selenium-arsenic alloy by any means known in the art to form selenium-coated articles. Furthermore, the dissolution of the selenium can be accomplished at ambient temperatures thus obviating the difficulty, danger and damage entailed in the use of hot corrosive solutions. In addition, the process of the present invention provides a convenient and simple means for separating the selenium-arsenic alloys into the pure substituents without employing additional process steps other than those employed to dissolve and subsequently separate the selenium.

The chemical reactions which are involved in the conversion to a water-soluble form, and the subsequent recovery of selenium from the resultant solution, in accordance with the present invention can be represented by the following equations:

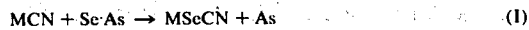

$$MCN + Se \cdot As \rightarrow MSeCN + As \qquad (I)$$

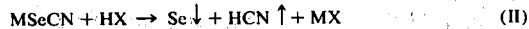

$$MSeCN + HX \rightarrow Se\downarrow + HCN\uparrow + MX \qquad (II)$$

wherein M is an alkali metal and X is an ion which does not form a water-soluble salt with selenium. While the above equations are specific to the conversion of selenium-arsenic alloys, they also represent the conversion of pure selenium since arsenic is not necessary for the formation of selenocyanates by contacting selenium with aqueous solutions of alkali metal cyanide. The conversion of the selenium to the selenocyanate is effected by immersing the selenium coated product in an aqueous solution of the alkali metal cyanide until substantially all of the selenium is dissolved in solution. This step can be completely affected at ambient temperatures; however, if desired, the solution can be heated to increase the rate of reaction.

The concentration of the alkali metal cyanide solution, the temperature of said solution and the period of treatment are interrelated and important parameters in achieving the objectives of the present invention. Generally, the alkali metal cyanide can be employed in concentrations varying from 1 to about 20% by weight of solution. Preferably, however, the alkali metal cyanide concentration ranges from about 5 to about 10 percent by weight. Under ambient conditions, i.e., about room temperature (25° C) and atmospheric pressure, the selenium or arsenic-selenium alloy coated metal substrate can be immersed in a cyanide solution having the above-defined concentration limits to effect substantially complete removal of the coating in a period of time of about one hour or less without impairing the substrate for reuse. If the temperature of the solution is raised from ambient temperatures (25° C) to about 50° to 75° C, the coating can be completely removed in 10 minutes or less and at the higher concentration levels, in a matter of 30 seconds or less. At the cyanide concentration levels employed in the present invention, it has been found that the amount of hydroxide generated or encountered is generally insufficient to impair the subsequent reuse of the substrate regardless of variations in temperature or time within the limits of these parameters as set forth herein.

It is considered important however, because of the interrelationship between the concentration, temperature and time parameters, that these parameters be adjusted commensurately to effect substantially complete conversion of the selenium in said coatings to water soluble selenocyanate without impairment of the substrate for reuse. Depending upon limitations imposed by existing equipment, operating constraints and the like, a suitable set of conditions can be readily ascertained. Generally, for example, if reduction in the period of time required for said treatment is desired, either or both the concentration of the cyanide solution or the temperature thereof can be increased within the limits set forth herein thereby effecting a reduction in the time required for treatment. Similarly, if use of dilute cyanide solutions are desired, the duration of treatment and/or the temperature can be increased. Further, if higher temperatures are desired, the duration of treatment and/or the concentration of the cyanide solution can be decreased.

It is generally considered preferrable to operate under ambient conditions of temperature (about 25° C) and normal atmospheric pressure. Operating in this manner affords the greatest latitude in selection of the concentration of the cyanide solution and the duration of treatment. Thus, under ambient conditions, the alkali metal cyanide can be employed in concentrations varying from 1 to about 20% by weight of solution and the period of treatment can be a finite period up to about one hour. Under these conditions, the selenium is effectively removed without damage to the underlying substrate. Most preferably, cyanide solutions having concentrations ranging from about 5 to about 10% by weight of cyanide are employed with ambient conditions since effectively complete removal of the selenium can be effected in less than one hour and generally, is less than about one-half hour.

When the aqueous cyanide solutions are employed at elevated temperatures of from about 50° C to 75° C, it is considered preferable to employ cyanide solutions having cyanide concentrations vaying from 1 to about 10% by weight for periods of 10 minutes or less. Under these conditions, essentially complete removal of the selenium in the coating is rapidly effected without impairment of the underlying surface. It has been found, however, that at the upper extremes of temperature, namely 75° C. hydrolysis effects can be manifested at the extremes of cyanide concentration and duration of treatment. Thus, at elevated temperatures, the cyanide concentration and period of treatment must be commensurately adjusted downwardly to avoid hydroxide attack on the underlying substrate.

Upon substantially complete dissolution of the selenium, the metal substrate is removed from the solution and the solution is mixed with an acid, such as hydrochloric acid, sulfuric acid and the like to decompose the selenocyanate and precipitate the selenium. The amount of acid employed is that which will decompose substantially all of the alkali metal selenocyanate in solution to permit recovery of substantially all of the selenium in accordance with the stoichiometric amounts as represented by equation II above. To assure substantially complete recovery of selenium, the acid is employed in amounts at least about 10% in excess of the stoichiometric amount. The hydrogen cyanide by-product is evolved as a gas and can be collected by contact with an aqueous solution of an alkali metal hydroxide, whereby it is converted to the corresponding alkali metal cyanide for reuse in the stripping step. The precipitated selenium is recovered as, for example, by centrifugation or filtration and is washed and collected.

Among the suitable alkali metal cyanides which can be employed are sodium cyanide, potassium cyanide, lithium cyanide, or mixtures thereof. Alkaline earth cyanides, such as calcium cyanide, have also been shown to be effective. Among the suitable acids which can be employed to precipitate selenium from solution are strong mineral acids such as hydrochloric acid, hydrobromic acid, nitric acid, sulfuric acid, or the like.

The following examples are preferred embodiments presented to illustrate the present invention. Parts and percentages are by weight unless otherwise indicated.

EXAMPLE I

Brass flat plates, 6 by 6 inches, having a 0.002-inch selenium-arsenic coating containing about 1.0 weight percent arsenic were immersed in aqueous solutions of sodium cyanide of varying concentrations as shown in Table 1. The solutions were not heated and the respective times necessary to substantially remove the arsenic-selenium coating under ambient conditions, i.e. about 25° C and atmospheric pressure, were noted. The arsenic precipitated from solution during contact of the coated brass plate with sodium cyanide. After the coating was removed from the plate, the plate was taken out of the solution and the arsenic was recovered by centrifugation and then washed. The remaining solution was treated with 12N hydrochloric acid to precipitate selenium metal. The hydrogen cyanide which evolved was passed through aqueous sodium hydroxide containing 20 g. of NaOH/100 ml to reform sodium cyanide.

The selenium metal was recovered by centrifugation, and it was washed. The percent recovery of arsenic and selenium are shown in Table 1.

TABLE I

| Sample | Sodium Cyanide Concentration (weight %) | Time to Dissolve As-Se Coating (minutes) | % Recovery Se | % Recovery As |
|---|---|---|---|---|
| 1 | 1 | 9.5 | 98 | 90 |
| 2 | 5 | 4.0 | 96 | 90 |
| 3 | 10 | 2.0 | 95 | 92 |
| 4 | 20 | 0.4 | 95 | 95 |

The same results are obtained using aqueous solutions of other cyanides such as potassium cyanide.

As shown in the example, the process of this invention provides an effective means for recovering selenium-arsenic alloy from a brass substrate. In no case was may corrosion of the surface of the brass substrate visibly detectable.

When 20% hot aqueous sodium sulfite was used in the foregoing procedure, the surface of the brass plates became pitted, and the plate ultimately disintegrated, indicating that the sulfite process would not produce reusable imaging plates.

EXAMPLE 2

An aluminum drum, 6 inches in diameter, having a 0.002-inch selenium coating was treated with a 10% aqueous solution of sodium cyanide for four minutes at room temperature and atmospheric pressure. The selenium was dissolved and the aluminum drum was removed from the solution. The resultant solution was mixed with about 1 liter of a 6 molar solution of sulfuric acid, and the selenium metal precipitated from the solution. It was separated by centrifugation, washed and weighed; recovery, 96%. There was no visibly detectable damage to the surface of the aluminum drum making it reusable for applying a selenium coating thereto.

The procedure of Example 2 was used to remove a selenium coating from a nickel drum and the results were similar both as to the successful recovery of the selenium and the lack of damage to the surface of the drum.

In the following examples, the test specimens each consisted of an aluminum substrate (2 × 2 × ⅛ inches) having a 27 micron thick film thereon of an arsenic-selenium alloy containing ½% by weight of arsenic, the balance being selenium. Each of six such specimens were wiped with a soft lens tissue and weighed on an analytical balance. After completion of the treatment as set forth below, the specimens were washed with cold water, dried and reweighed. Once specimen was placed in each of six 250 ml. beakers in an upright position, i.e., the substrate was in substantially the same plane as the height of the beaker. Each beaker was filled with an aqueous sodium cyanide solution in an amount sufficient to cover the entire sample. The solution concentrations were 0.1, 0.3, 3, 5, 10 and 20% by weight sodium cyanide. The samples were placed in a hood and timed to determine the effect of the various concentrations of sodium cyanide on the arsenic/selenium coatings.

EXAMPLE 3

In this example, testing in the manner described above was conducted with the sodium cyanide solutions at ambient temperature and pressure.

The data obtained is summarized in Table II below:

TABLE II

| NaCN % Conc. | Weight (gms.) Before | After | Loss | Alloy Loss (%) | Observation |
|---|---|---|---|---|---|
| 0.1 | 15.1156 | 15.1087 | 0.0069 | 3 | Slight Attack in 1 hr. |
| 0.3 | 15.2748 | 15.2608 | 0.0140 | 6 | Slight Attack in 1 hr. |
| 3.0 | 15.4025 | 15.2545 | 0.1480 | 60 | Strong Attack in 1 hr. |
| 5.0 | 16.8917 | 16.6451 | 0.2466 | 100 | Dissolved in 1 hr. |
| 10.0 | 15.8790 | 15.6315 | 0.2475 | 100 | Dissolved in 19 min. |
| 20.0 | 15.8849 | 15.6380 | 0.2469 | 100 | Dissolved in 5 min. |

This example clearly demonstrates that dilute cyanide solutions are ineffective for removing the alloy coating from the substrate within one hour.

EXAMPLE 4

In this example, testing in the manner described above was conducted with the sodium cyanide solution at a temperature of 75° C ± 1° C. and at atmospheric pressure.

The data obtained is summarized in Table III below.

TABLE III

| NaCN % Conc. | Weight (gms.) Before | Weight (gms.) After | Loss | Alloy Loss (%) | Observation |
|---|---|---|---|---|---|
| 0.1 | 15.4019 | — | — | — | Peeled off in 45 min.* |
| 0.3 | 15.7102 | — | — | — | Peeled off in 35 min.* |
| 3.0 | 15.4505 | 15.2601 | 0.1904 | 100 | Dissolved in 7 min. |
| 5.0 | 16.2492 | 16.0068 | 0.2424 | 100 | Dissolved in ½ min. |
| 10.0 | 17.1280 | 16.8816 | 0.2474 | 100 | Dissolved in 30 sec. |

*Alloy curled into a hard mass.

This example illustrates that dilute solutions at elevated temperatures are ineffective in dissolving the selenium from the coating however, there is sufficient sodium hydroxide generated by hydrolysis to separate the coating intact from the substrate through an attack on the aluminum by the sodium hydroxide. Upon separation of the coatings, they did not dissolve but instead curled into hard masses which substantially interfered with and complicated the recovery of the selenium and the separation and recovery of arsenic therefrom.

EXAMPLE 5

In this example, the test specimens each consisted of an uncoated aluminum substrate (2 × 2 × ⅛ inches). Each specimen was wiped with a soft lens tissue and weighed on an analytical balance. After completion of treatment as set forth below, the specimens were washed with cold water, dried and reweighed. The weight loss of aluminum as a percentage of the original weight is reported below as a measure of the extent of attack on the substrate by the hydrolysis by-product.

One specimen was placed in each of four 250 ml. beakers in an upright position. Each beaker was filled with an aqueous sodium cyanide solution in an amount sufficient to cover the entire sample. In two of the beakers, the solution concentrations were each 20%. In the other two beakers, the solution concentrations were each 40% representing concentrated aqueous cyanide solutions. Samples at each concentration level were placed in a hood under ambient conditions and the remaining samples at each concentration level were heated to 75° ± 1° C and also placed in the hood. All samples were in the hood for 1 hour. the results obtained are summarized in Table IV below.

TABLE IV

| | Weight Loss (wt. %) in One Hour | |
|---|---|---|
| Cyanide Conc. (1%) | Ambient Temp. | 75° C |
| 20 | 0.1 | 9 |
| 40 | 1.0 | * |

* Complete Catastrophic Corrosion

It can be seen that under ambient conditions, an insignificant amount of corrosion occurs at the maximum concentration and time limits employed in the present invention. In comparison, using a 40% cyanide solution, a ten fold increase in corrosion occurs. At 75° C., use of a 20% cyanide solution for one hour results in excessive corrosion. It can be seen from Table III that at this temperature, even a 10% solution will effectively dissolve the selenium in the coating in only 30 seconds. Accordingly, this example clearly indicates that at higher temperatures, a commensurate reduction in either or both concentration and time are required to effectively remove the selenium without impairment of the substrate. At 40%, complete catastrophoric corrosion occurs rapidly essentially precluding reuse of the substrate.

Although specific materials and conditions were set forth in the above examples for removing selenium-containing coatings from substrates without impairment of the substrate for reuse, these are merely intended as illustrations of the present invention. Various other alkali metal cyanides, substrates, temperatures, concentrations, treatment periods and the like such as those listed above may be substituted in the examples with similar results.

Other modifications of the present invention will occur to those skilled in the art upon a reading of the present disclosure. These are intended to be included within the scope of this invention.

What is claimed is:

1. A process for recovering pure selenium from a selenium-containing coating on a metal substrate without impairment of the substrate for reuse which comprises immersing the coated substrate in an aqueous solution of an alkali metal cyanide containing from 1 to about 20% by weight of an alkali metal cyanide maintained at a temperature varying from about 25° to about 75° C. for a finite period of about one hour or less, the temperature and time period employed being commensurate with the alkali metal cyanide concentration such that the selenium in said coating is substantially converted to a water-soluble selenocyanate without impairing the substrate for reuse, removing the substrate from the resulting solution, and treating the resulting solution with an acid to precipitate the selenium from said solution.

2. Process as defined in claim 1 wherein the selenium-containing coating is a selenium-arsenic alloy and upon immersing the coated substrate in said alkali metal cyanide solution, the selenium in said coating is substantially converted to a water-soluble selenocyanate and the arsenic in said coating separates as a precipitate.

3. Process as defined in claim 1 wherein the selenium-containing coating is essentially a selenium coating.

4. Process as defined in claim 1 wherein the metal substrate comprises aluminum, copper, brass or nickel.

5. A process as defined in claim 1 wherein the coated substrate is immersed in an aqueous solution of an alkali metal cyanide containing from 1 to about 20% by weight of an alkali metal cyanide maintained at ambient conditions for a finite period of about one hour or less.

6. Process as defined in claim 5 wherein the concentration of the alkali metal cyanide in the solution ranges from about 5 to about 10 percent by weight.

7. A process as defined in claim 1 wherein the coated substrate is immersed in an aqueous solution of an alkali metal cyanide containing from 1 to about 10% by weight of an alkali metal cyanide maintained at a temperature varying from about 50° C to about 75° C for a finite period of about 10 minutes or less.

8. Process as defined in claim 1 wherein the amount of acid employed is sufficient to decompose substantially all of the alkali metal selenocyanate in solution.

9. Process as defined in claim 1 wherein upon addition of the acid, hydrogen cyanide is evolved as a gas and is contacted with an alkali metal hydroxide to convert said gas to the corresponding alkali metal cyanide.

10. Process as defined in claim 1 wherein the alkali metal cyanide is sodium cyanide.

* * * * *

UNITED STATES PATENT AND TRADEMARK OFFICE
CERTIFICATE OF CORRECTION

PATENT NO. : 3,992,511
DATED : November 16, 1976
INVENTOR(S) : Kenneth A. Waehner; Anthony T. Giammarise It is certified that error appears in the above-identified patent and that said Letters Patent are hereby corrected as shown below:

Column 1, line 31, delete "howevr" and insert --however--.

Column 6, line 17, delete "preferrable" and insert --preferable--.

Column 6, line 37, delete "vaying" and insert --varying--.

Column 7, line 62, delete "may" and insert --any--.

Column 8, line 29, delete "once" and insert --one--.

Column 9, line 45, delete "the" and insert --The--.

Signed and Sealed this

Twelfth Day of April 1977

[SEAL]

Attest:

RUTH C. MASON
Attesting Officer

C. MARSHALL DANN
Commissioner of Patents and Trademarks